United States Patent [19]

Siol et al.

[11] Patent Number: 4,771,098

[45] Date of Patent: Sep. 13, 1988

[54] PROCESS FOR PREPARING ACRYLIC RESIN DISPERSIONS

[75] Inventors: Werner Siol, Pfungstadt; Hubert Rauch, Weiterstadt; Norbert Sütterlin, Ober-Ramstadt, all of Fed. Rep. of Germany

[73] Assignee: Röhm GmbH Chemische Fabrik, Darmstadt, Fed. Rep. of Germany

[21] Appl. No.: 935,151

[22] Filed: Nov. 25, 1986

Related U.S. Application Data

[63] Continuation of Ser. No. 689,512, Jan. 9, 1985, abandoned, which is a continuation of Ser. No. 413,164, Aug. 30, 1982, abandoned.

[30] Foreign Application Priority Data

Aug. 29, 1981 [DE] Fed. Rep. of Germany ....... 3134222

[51] Int. Cl.$^4$ ............................. C08J 9/04; C08F 2/00
[52] U.S. Cl. .................................. 524/827; 524/732; 524/747; 526/200; 526/209; 526/225
[58] Field of Search ...................... 524/827, 732, 747; 526/209, 225, 200

[56] References Cited

U.S. PATENT DOCUMENTS 3,696,067 11/1971 Trofimow ..................... 260/28.5 D
3,732,184 5/1973 Lindemann et al. ........ 260/77.5 BB
3,796,680 3/1974 Brockway et al. ............ 260/29.6 D
3,947,400 3/1976 Burkhard et al. .................... 524/747
4,081,418 3/1978 Barua et al. .......................... 526/209

FOREIGN PATENT DOCUMENTS 713492 8/1954 United Kingdom .

OTHER PUBLICATIONS

*Table of Physical Properties,* Laboratory Manual, vol. 40, 17th Edition; Union Carbide Chemicals Company (1960), pp. 2 and 3.
The Merck Index, Tenth Edition (1983), p. 850, Compound 5797.

*Primary Examiner*—Joseph L. Schofer
*Assistant Examiner*—Peter D. Mulcahy
*Attorney, Agent, or Firm*—Oblon, Fisher, Spivak, McClelland & Maier

[57] ABSTRACT

Acrylic resin dispersions are prepared by a monomer addition process in the presence of a free-radical initiator and an emulsifier, wherein a portion of the emulsifier is dissolved in the initial aqueous phase and the remaining portion in the added monomer phase. The new process decreases the formation of coagulates, reduces the required amount of emulsifier, and allows the preparation of dispersions of resins incorporating a large proportion of units derived from water-soluble monomers, such as carboxylic acids.

8 Claims, No Drawings

PROCESS FOR PREPARING ACRYLIC RESIN DISPERSIONS

This application is a continuation of application Ser. No. 689,512, filed Jan. 9, 1985, now abandoned, which is a continuation of application Ser. No. 413,164, filed Aug. 30, 1982, now abandoned.

BACKGROUND OF THE INVENTION

1. Field of the Invention

This invention relates to processes for preparing aqueous resin dispersions wherein the dispersed resin comprises more than 50%, by weight, of acrylic monomers, and more particularly to preparing such dispersions by monomer-addition processes.

2. Description of the Prior Art

In monomer-addition processes for preparing acrylic resin dispersions a homogeneous liquid monomer phase, containing the acrylic monomers and, optionally, smaller amounts of other monomers and other materials dissolved therein, is added to a prepared aqueous phase in the presence of a free-radical initiator and an emulsifier under conditions appropriate for polymerization.

A monomer-addition process for preparing acrylic resin dispersions is disclosed in German Pat. No. 2,135,073. During the polymerization, a monomer mixture is gradually added to an aqueous phase in which an initiator and an emulsifier are dissolved. In this process troublesome amounts of coagulated material can easily form, especially when the dispersion so prepared has a high solids content.

It is known from German Pat. No. 1,119,513, to add aqueous solutions of initiators and emulsifiers slowly, simultaneously with the monomer phase, but separate therefrom, in processes of this type. However, these processes also have a tendency to form coagulated material.

In the preparation of aqueous resin dispersions based on vinylaromatic monomers, it is known from British Pat. No. 713,492 to dissolve the emulsifier in the monomer phase and to add this gradually, under conditions suitable for polymerization, to an aqueous phase which is free of emulsifiers. An aqueous initiator solution is added separately at the same time. These processes yield thin vinyl aromatic resin dispersions having very large particles which are unsuitable for many industrial purposes because of their low viscosity and large particle size.

According to the processes of emulsion polymerization used hitherto, e.g., emulsion addition processes, dispersions having limited solids content or a low content of carboxylic acid groups can be easily prepared, especially when large proportions of emulsifiers can be used.

On the other hand, difficulties arise in these processes, especially when small proportions of emulsifiers are used, when the solids content is increased to 55%, by weight, or above, or more than 6%, by weight, of water-soluble monomers are incorporated and it is desired to control the particle size at the same time. Highly concentrated dispersions are desirable because of their lesser weight and volume, relative to the resin content, and because of the lesser energy requirement in spray drying or drying of impregnated material.

Dispersions having a high proportion of units derived from water-soluble monomers incorporated therein are required, for example, as coating materials for drug dosage forms. They can be prepared by emulsion addition processes or the single pot process only with difficulty, since forming the monomer emulsion is difficult in itself. High concentrations of emulsifier are needed because of the requirement for forming very small latex particles. When latex particles of dissimilar chemical composition are formed incompatibilities arise and, consequently, coagulation.

Therefore, a need has continued to exist for a process of preparing aqueous acrylic polymer dispersions which avoids the problems of known processes for preparing these materials.

SUMMARY OF THE INVENTION

Accordingly, it is an object of this invention to prepare aqueous acrylic dispersions.

A further object is to provide a process for preparing acrylic resin dispersions having a small particle size.

A further object is to prepare acrylic resin dispersions wherein the resin contains a relatively large proportion of units derived from water-soluble monomers.

A further object is to prepare acrylic resin dispersions having a high solids content.

A further object is to prepare acrylic resin dispersions having a good viscosity.

Further objects of the invention will become apparent from the description of the invention which follows.

The object of this invention can be attained by a process wherein acrylic resin dispersions are prepared by adding a monomer mixture to an aqueous phase under appropriate polymerization conditions wherein a portion of the emulsifier content used is in the aqueous phase and the remainder is dissolved in the monomer phase.

The process of the invention makes it possible to attain solids contents of, e.g., 64% by weight, even at low emulsifier concentration. Furthermore, by the process of the invention dispersions having a high proportion of unsaturated carboxylic acids or other water-soluble monomers can be prepared without difficulty, and any troublesome coagulation can be avoided. It is possible to operate with a very small proportion of emulsifier, and it is possible to control the particle size of the latex as described by the distribution of the emulsifier between the prepared aqueous phase and the added monomer phase. The particle size is among the most important parameters which determine the technical properties effecting the application of the dispersion, e.g., its viscosity, its stability or its film-forming properties.

DESCRIPTION OF THE PREFERRED EMBODIMENTS

The monomer phase comprises predominantly acrylic monomers. These include acrylic and methacrylic acids, their nitriles, their optionally N-substituted amides, such as N-methylolamides, N-methyloletheramides, N-aminoalkylamides, as well as the esters of these acids. The esters can be derived from aliphatic alcohols and may optionally contain other functional groups in the alcohol radical, e.g., hydroxyl groups, ether groups, dialkylamino groups, trialkylammonium salt groups, epoxide groups or carboxylic or sulfonic acid groups or their salt forms.

These acrylic monomers make up more than 50%, by weight, preferably 60-100%, by weight, of the monomer phase. In addition, other monomers which are copolymerizable with the acrylic monomers can be used, e.g., styrene, vinyltoluene, α-methylstyrene, N-vinylpyrrolidone, vinylimidazole, vinylimidazline, vinylimidazolidine, maleic acid and fumaric acid and their esters or half esters, olefins and dienes, vinyl esters, vinyl chloride and vinylidene chloride.

In general, at least a portion of the monomers must be water-insoluble, in order to form latex particles. Those monomers are considered water-insoluble which are less than 10%, by weight, soluble in water at room temperature. The proportion of these monomers in the monomer phase is generally not less than 30%, by weight, preferably not less than 45%, by weight, and may even be as great as 100%,. These monomers include, among others, the alkyl esters of acrylic and methacrylic acids having e.g., 1–18 C-atoms in the alkyl radical, acrylonitrile or methacrylonitrile and styrene.

Water-soluble comonomers, which can form at least a 10%, by weight, solution at room temperature, can be present in the monomer phase to the extent that the latex particles formed are water-insoluble at least in a limited pH range. These water-soluble monomers include, among others, acrylamide and methacrylamide and their N-methylol compounds, hydroxy esters of acrylic or methacrylic acids, such as, e.g., 2-hydroxyethylacrylate and -methacrylate, 2-hydroxypropylacrylate and -methacrylate, 4-hydroxybutylacrylate and -methacrylate, as well as aminoalkyl esters of these acids such as, e.g., dimethylaminoethylacrylate, and -methacrylate, diethylaminoethylacrylate and -methacrylate, N-butylaminoethylacrylate and -methacrylate, 3-dimethylamino-2,2-dimethylpropyl acrylate and methacrylate, as well as the salts of these amino esters with inorganic or organic acids or compounds formed by quaternization of these compounds.

A preferred group of water-soluble comonomers are the α,β-ethylenically unsaturated carboxylic acids and dicarboxylic acids, especially acrylic and methacrylic acids.

The invention offers special advantages in the otherwise difficult preparation of dispersions of resins containing more than 6%, preferably 10–70%, and especially 25–55%, by weight, of these acids or a total of more than 10%, by weight, of copolymerized water-soluble monomers and/or acrylonitrile and/or methacrylonitrile.

Emulsifiers

In the process of this invention the anionic, non-ionic or cationic emulsifiers conventional in emulsion polymerization or their compatible mixtures can be used, provided that they are sufficiently soluble both in the aqueous phase and in the monomer phase and do not interact with the monomers or other additives to cause problems. Anionic emulsifiers are preferred. These include principally the emulsifiers prepared by oxyethylation of alkylphenyols and formation of sulfate esters of these compounds. They are derived, for example, from nonylphenol, isononylphenol or triisobutylphenol and contain 5–10 ethylene oxide residues. Further examples of conventional emulsifiers include soaps, sodium lauryl sulfate and paraffin sulfonates. Besides the anionic emulsifiers non-ionic emulsifiers which are soluble in the monomer phase, are frequently used.

The proportion of (preferably anionic) emulsifiers can be kept very low in the process of this invention. In many cases 0.05 to 1.5%, often less than 0.5% calculated on the weight of the monomer phase, is sufficient. However, larger amounts, e.g., up to 2%, by weight, of an anionic emulsifier can be used. The amount of non-ionic emulsifier can reach 5–10%, by weight, calculated on the aqueous phase. The amount of emulsifier which is dissolved in the prepared water phase at the beginning of polymerization has a decisive effect on the particle size of the resulting dispersion. The greater the emulsifier concentration, the smaller are the latex particles formed. Particle diameters between 0.05 and 0.2 μm are achieved, e.g., by addition of 0.005 to 0.03%, by weight, of an anionic emulsifier to the aqueous phase.

An additional amount of emulsifier is dissolved in the monomer phase. This amount can be equal to or greater or less than the amount of emulsifier dissolved in the aqueous phase, according to the desired particle size. Either the same emulsifier or a different one can be used. The amounts of emulsifiers used in the aqueous phase and the monomer phase are preferably so distributed that 0.5–60%, by weight, of the emulsifier used is dissolved in the aqueous phase and the remaining 99.5–40%, by weight, is dissolved in the monomer phase. In the preparation of dispersions having a large particle size it is necessary to add a monomer phase poor in emulsifier at the beginning of the polymerization and later to increase the amount of emulsifier (cf. Examples 9 and 10). In most cases there is no difficulty in finding an emulsifier which forms a homogenous solution in the monomer phase. In general, the results obtained are not the same when the emulsifier is added to the preparation separately, for example, as an aqueous solution, during the polymerization.

Procedure

The aqueous phase containing the emulsifier is prepared in a polymerization vessel and brought to the polymerization temperature. It is convenient to add a water-soluble radical initiator before the beginning of the monomer addition, generally alkali or ammonium persulfate. However, the initiator, or a portion thereof, can be added during the polymerization, uniformly or in portions. The monomer phase, which comprises a liquid monomer mixture and the emulsifiers dissolved therein, is gradually added during the course of the polymerization according to the progress of the reaction, and is continously emulsified in the aqueous phase by means of a stirrer. A relatively small portion of the monomers can be optionally emulsified in the aqueous phase before initiation of polymerization. According to the preferred procedure the monomer phase is added at a uniform rate over a period of 1–5 hours. The polymerization can also be carried out with a redox initiator system. The ratio of amount of aqueous phase to that of monomer phase is controlled by the desired solids content of the dispersion. A dispersion having a 50–55% content is formed when 100–120 parts by weight of monomer phase is added to 100 parts by weight of aqueous phase. The process of the invention, however, also makes it possible to add, e.g., 150 or more parts by weight of monomer phase and in this way to prepare dispersions having 60% solids content or greater.

Preferred Dispersions According to the Process of the Invention

The known addition emulsion polymerization process in which the monomer is gradually added to the prepared solution as an aqueous emulsion, has the advantage that the heat capacity of the water takes up a portion of the heat of polymerization, so that the temperature can be more easily controlled. The monomer addition process of this invention does not enjoy this advantage. Accordingly, this process will be used principally when other advantages surpass this disadvantage, e.g., the preparation of new dispersions which cannot be prepared by other procedures or when the other procedures have substantial disadvantages, such as greater formation of coagulates. These dispersions include (1) dispersions of acrylic resins containing more than 10%, by weight, preferably more than 20%, by weight, (calculated on the weight of the resin portion) of copolymerized monomer units of water-soluble monomers and/or acrylonitrile and/or methacrylonitrile, or more than 6%, by weight, of residues of unsaturated polymerizable carboxylic acids, and which have a resin content of more than 40%, by weight, calculated on the total weight; especially (2) dispersions of acrylic resins having a high proportion of acrylic and/or methacrylic acid units and a high solids content, wherein the water content of the dispersion, in percent of the total weight, is no greater than the percentage of the acrylic or methacrylic acid units in the weight of the resin portion. These percentages have, it is true, different points of reference, and are not comparable in the sense of a mass balance; however, the comparison of these numbers conveys the empirical estimation that dispersions having a high content of carboxy groups are more difficult to prepare the higher their solids content, i.e., the lower their water content.

(3) acrylic dispersions having a resin content of at least 60%, by weight, (calculated on the total weight) and a proportion of less than 0.5%, by weight, of low molecular weight anionic emulsifiers, calculated on the weight of the resin portion.

Having generally described the invention, a more complete understanding can be obtained by reference to certain specific examples, which are provided herein for purposes of illustration only and are not intended to be limiting unless otherwise specified.

EXAMPLE 1

Dispersion having a high acid content

In a polymerization reactor equipped with a stirrer, thermometer, and a jacket for heating and/or cooling, a solution of the following composition is prepared and heated to 80° C.:
1 g sodium lauryl sulfate
5 g ammonium peroxydisulfate
4250 g distilled water.

To this solution is added dropwise at 80° C. over a period of 4 hours a monomer-emulsifier solution, prepared from
1020 g ethylacrylate
780 g methacrylic acid
5 g 2-ethylhexyl thioglycolate
40 g polyoxyethylenesorbitan monooleate.

After the addition the reaction is conducted for an additional 2 hours at 80° C. After cooling to room temperature an easily handleable dispersion free of coagulation is obtained.

Solids content: 30%; pH: 2.4; viscosity: 6 mPa.s.

EXAMPLES 2-6

The procedure of Example 1 is repeated, however, with varied composition of the prepared aqueous phase and the added monomer-emulsifier phase (see Table 1). In Table 1 the analytical data for the dispersions prepared in this way are presented.

TABLE 1

DISPERSIONS HAVING A LARGE PROPORTION OF ACID GROUPS

| Example No. | Composition of the Monomer Phase(s) | | | | | | Initial Solution (g) | | Content of Coagulates (%) | Solids Content (%) | pH |
|---|---|---|---|---|---|---|---|---|---|---|---|
| | EA | MMA | MA | Emulsifier | Water | Regulator[3] | APS | NaLS | | | |
| 2 | 1260 | — | 540 | 40[4] | — | — | 4[1] | 1[1] | coagulate free | 30 | 2.4 |
| 3 | 900 | — | 900 | 40[4] | — | 5 | 4[1] | 1[1] | coagulate free | 30 | 2.4 |
| 4 | 540 | — | 1260 | 40[4] | — | 5 | 4[1] | 3[1] | 3 | 29 | 2.3 |
| 5 | 630 | 630 | 540 | 1[5] | 8 | 5 | 2[1] | 1[1] | coagulate free | 30 | 2.6 |
| 6 | — | 1800 | 600 | 15[5] | 15 | 10 | 4[2] | 1[2] | 0.1 | 40 | 2.3 |

[1]dissolved in 4250 g of distilled water
[2]dissolved in 3600 g of distilled water
[3]2-Ethylhexyl thioglycolate
[4]Polyoxyethylenesorbitan monooleate
[5]Sodium lauryl sulfate
EA = Ethyl acrylate
MMA = Methyl methacrylate
MA = Methacrylic Acid
APS = Ammonium peroxydisulfate
NaLS = Sodium lauryl sulfate

EXAMPLE 7

In a polymerization reactor of the type described in Example 1 but bigger, the following solution was prepared and heated to 80°;
90 g ethoxylated triisobutylphenol (6 moles of ethylene oxide)sulfate, sodium salt
80 g ammonium peroxydisulfate
30,300 g distilled water.

To this solution was added over a period of 4 hours a monomer-emulsifier mixture comprising:
7000 g butyl acrylate
6300 g acrylonitrile
5000 g methyl methacrylate
1600 g methylacrylic acid
100 g 2-ethylhexyl thioglycolate
50 g ethoxylated triisobutylphenol (6 moles of ethylene oxide) sulfate, sodium salt
50 g distilled water.

After the completion of the addition, the reaction was allowed to proceed for 2 hours at 80° C. with stirring. After cooling to room temperature a coagulate-free dispersion having very small particles was obtained. Solids content: 40%.

EXAMPLE 8

Dispersion with high solids content and a small amount of emulsifier

In a polymerization reactor equipped with a stirrer, thermometer, and jacket for heating and/or cooling, a solution having the following composition was prepared and heated to 80° C.:
0.08 g ethoxylated triisobutylphenol (6 moles of ethylene oxide)sulfate, sodium salt
2.4 g ammonium peroxydisulfate
800 g distilled water.

To this solution was added at 80° C. over a 4 hour period a monomer-emulsifier mixture prepared from
638 g methyl methacrylate
550 g butyl acrylate
12 g methacrylic acid
4 g ethoxylated triisobutylphenol (6 moles of ethylene oxide)sulfate, sodium salt
4 g distilled water.

After the completion of the addition 2 ml of 25% aqueous ammonium hydroxide solution was added, and the solution was subsequently stirred for 2 hours at 80° C. After cooling to room temperature, an easily filterable, coagulate free dispersion was obtained. Solids content: 60%; pH: 7.8; Viscosity: 130 mPa.s; Particle diameter: 630 nm.

EXAMPLE 9

In a polymerization reactor of the type described in Example 1, a solution of the following composition was prepared and heated to 80° C.;
0.04 g sodium tetradecylsulfonate
0.04 g ammonium peroxydisulfate
800 g distilled water.

To this solution was added at 80° C. over a period of 30 minutes a mixture (first addition) of:
96 g methyl methacrylate
51 g butyl methacrylate
3 g methacrylic acid
0.2 g ethoxylated triisobutylphenol (6 moles of ethylene oxide)sulfate, sodium salt
1.5 g distilled water.

Subsequently the following mixture (second addition) was added over a period of 3.5 hours:
672 g methyl methacrylate
357 g butyl methacrylate
21 g methacrylic acid
6 g ethoxylated triisobutylphenol (6 moles of ethylene oxide)sulfate, sodium salt
6 g distilled water.

After the completion of the addition, the mixture was stirred for 2 hours at 80° C. After cooling to room temperature, an easily filterable dispersion was obtained. Solids content: 60%; pH: 2.4; Viscosity: 720 mPa.s; Particle diameter: 580 nm.

EXAMPLE 10

The procedure of Example 9 was followed, except that the monomer mixture was modified.
First addition (period: 30 minutes)
75 g butyl methacrylate
75 g methyl methacrylate
0.2 g ethoxylated triisobutylphenol (6 moles of ethylene oxide)sulfate, sodium salt
1.5 g distilled water.
Second addition (period: 210 minutes)
525 g butyl methacrylate
525 g methyl methacrylate
6 g ethoxylated triisobutylphenol (6 moles of ethylene oxide)sulfate, sodium salt
6 g distilled water.
Solids content: 60%; pH: 2.6; Viscosity: 900 mPa.s; Particle diameter: 620 nm.

What is claimed as new and sought to be protected by Letters Patent of the United States is:

1. A process for preparing an aqueous dispersion of an acrylic resin having a high solids content, comprising:
    (a) preparing a homogeneous phase consisting essentially of more than 20% by weight of water-soluble monomers, acrylonitrile, methacrylonitrile, or mixtures thereof, said monomer phase containing at least 50% by weight of an acrylic monomer selected from the group consisting of acrylic acid, methacrylic acid, acrylonitrile, methacrylonitrile, acrylamide, methacrylamide, and N-substituted amide of acrylic acid or methacrylic acid, esters of said acrylic acid and methacrylic acid with aliphatic alcohols and esters of said acids, the alcohol fragment of which is substituted by at least one hydroxyl group, ether group, dialkylamino group, epoxy group, trialkylammonium salt group or carboxylic acid group, or sulfonic acid group, or a salt of these acids and an emulsifier such that any water present in the monomer phase is not present in an amount sufficient to form an emulsified monomer phase and the monomer phase is not in an emulsified form when added to the aqueous phase;
    (b) adding said monomer phase to an aqueous phase containing water-soluble initiator and an emulsifier, each of said emulsifiers, whether the same or different, being soluble in water, said emulsifiers being cationic emulsifiers, anionic emulsifiers or nonionic emulsifiers with the total amount of anionic emulsifier when used ranging up to 2% by weight of the composition, and the amount of nonionic emulsifier when used ranging up to 10% by weight of the composition, and wherein from 0.5–60% by weight of the total amount of emulsifier used is dissolved in the aqueous phase and from 99.5–40% by weight of the total amount of emulsifier used is dissolved in the monomer phase; and
    (c) polymerizing the said monomers, said polymerization occurring as the homogeneous monomer phase is added to the aqueous emulsion phase.

2. The process of claim 1 wherein at least 120 parts by weight of said monomer phase are added to 100 parts by weight of said aqueous phase.

3. The process of claim 1 wherein said emulsifier is an anionic emulsifier.

4. The process of claim 3 wherein said anionic emulsifier is used in a total amount of 0.05 to 1.5%, by weight, of the monomer phase.

5. The process of claim 1 wherein said emulsifier is a nonionic emulsifier.

6. A dispersion of a synthetic acrylic resin in water, said synthetic acrylic resin comprising at least 40%, by weight, of said dispersion wherein said synthetic resin is derived from at least 50% acrylic monomers and contains at least 20%, by weight, of copolymerized monomer units selected from the group consisting of water-soluble monomers, acrylonitrile, and methacrylonitrile.

7. The synthetic resin dispersion of claim 6 wherein the water content of the dispersion is not greater than the weight percentage of the acrylic acid and methacrylic acid units in the synthetic resin portion of the dispersion.

8. A dispersion of a synthetic resin in water said synthetic resin being predominantly derived from acrylic monomers, and said dispersion having a resin content of at least 60% by weight of the dispersion and containing less than 0.5% by weight of a low molecular weight anionic emulsifier, calculated on the amount of synthetic resin present in said dispersion.

* * * * *